(12) United States Patent
Mulka et al.

(10) Patent No.: US 11,916,874 B2
(45) Date of Patent: *Feb. 27, 2024

(54) SYSTEMS AND METHODS FOR ROUTING DATA USING SOFTWARE-DEFINED NETWORKS

(71) Applicant: McAfee, LLC, San Jose, CA (US)

(72) Inventors: Shivakrishna Anandam Mulka, Bangalore (IN); Shankar Subramanian, Bangalore (IN); Jayakrishnan Karunakaran Nair, Bangalore (IN); Gopal Agrawal, Bangalore (IN); Shankar Ganesh Pillaiyar Nattamai Jeyaprakash, Bangalore (IN)

(73) Assignee: McAfee, LLC, San Jose, CA (US)

( * ) Notice: Subject to any disclaimer, the term of this patent is extended or adjusted under 35 U.S.C. 154(b) by 221 days.

This patent is subject to a terminal disclaimer.

(21) Appl. No.: 17/219,691

(22) Filed: Mar. 31, 2021

(65) Prior Publication Data

US 2021/0218706 A1    Jul. 15, 2021

Related U.S. Application Data

(63) Continuation of application No. 15/739,489, filed as application No. PCT/US2016/032996 on May 18, 2016, now Pat. No. 11,102,173.

(30) Foreign Application Priority Data

Jun. 26, 2015 (IN) .......................... 3212/CHE/2015

(51) Int. Cl.
*H04L 9/40* (2022.01)
*H04L 45/00* (2022.01)
(Continued)

(52) U.S. Cl.
CPC .......... *H04L 63/0236* (2013.01); *H04L 45/38* (2013.01); *H04L 47/2483* (2013.01);
(Continued)

(58) Field of Classification Search
CPC . H04L 63/0236; H04L 45/38; H04L 47/2483; H04L 63/0227; H04L 63/1408; H04L 45/64
(Continued)

(56) References Cited

U.S. PATENT DOCUMENTS 9,038,151 B1 * 5/2015 Chua ....................... H04L 47/10
726/1
11,102,173 B2 * 8/2021 Mulka ................. H04L 63/0236
(Continued)

FOREIGN PATENT DOCUMENTS

GB        2418563 A      3/2006
WO    2016209426 A1    12/2016

OTHER PUBLICATIONS

National Intellectual Property Administration of China, "First Office Action," mailed in connection with Chinese Patent Application No. 201680047309.3, dated Sep. 1, 2020, 10 pages.
(Continued)

*Primary Examiner* — Lynn D Feild
*Assistant Examiner* — Saad Ahmad Abdullah
(74) *Attorney, Agent, or Firm* — Hanley, Flight & Zimmerman, LLC (57) ABSTRACT

Provided in some embodiments are systems and methods for determining a data flow path including a plurality of network devices for routing data from a first network device to a second network device; determining for the network devices one or more flow rules that specify an input for receiving data, an output for outputting data, and a role tag indicative of a role of a network device, where the role tag for one or
(Continued)

more flow rules for a first network device of the network devices indicates a source role; distributing, to the network devices, the one or more flow rules; determining malicious activity on the data flow path; determining that the first network device is a source based at least in part on the role tag for the first network device; and sending, to the first network device, a blocking flow rule to inhibit routing of malicious data.

20 Claims, 5 Drawing Sheets (51) Int. Cl.
  *H04L 47/2483* (2022.01)
  *H04L 45/64* (2022.01)
(52) U.S. Cl.
  CPC ...... *H04L 63/0227* (2013.01); *H04L 63/1408* (2013.01); *H04L 45/64* (2013.01)
(58) Field of Classification Search
  USPC .......................................................... 726/13
  See application file for complete search history.

(56) References Cited

U.S. PATENT DOCUMENTS

| | | | |
|---|---|---|---|
| 2002/0035698 A1 | 3/2002 | Malan et al. | |
| 2006/0206615 A1* | 9/2006 | Zheng | H04L 63/0227 709/229 |
| 2013/0064247 A1* | 3/2013 | Song | H04L 12/4675 370/392 |
| 2014/0137215 A1* | 5/2014 | Hummel | H04L 12/4641 726/5 |
| 2015/0009830 A1* | 1/2015 | Bisht | H04L 47/125 370/236 |
| 2015/0052243 A1 | 2/2015 | Lumezanu | |
| 2015/0103642 A1* | 4/2015 | Stuart | H04L 43/0811 370/248 |
| 2015/0103672 A1 | 4/2015 | Stuart | |
| 2015/0172193 A1* | 6/2015 | Sinha | H04L 47/22 370/230 |
| 2018/0191679 A1 | 7/2018 | Mulka et al. | |

OTHER PUBLICATIONS

International Bureau, "International Preliminary Report on Patentability," mailed in connection with International Patent Application No. PCT/US2016/032996, dated Jan. 4, 2018, 10 pages.
United States Patent and Trademark Office, "Non-Final Office Action," mailed in connection with U.S. Appl. No. 15/739,489, dated Jan. 7, 2020, 12 pages.
United States Patent and Trademark Office, "Final Office Action," mailed in connection with U.S. Appl. No. 15/739,489, dated Jul. 10, 2020, 13 pages.
United States Patent and Trademark Office, "Notice of Allowance," mailed in connection with U.S. Appl. No. 15/739,489, dated Dec. 23, 2020, 11 pages.
International Searching Authority, "International Search Report & Written Opinion", issued in connection with International Patent Application No. PCT/US2016/032996, dated Aug. 8, 2016 (11 pages).
European Patent Office, "European Search Report," issued in connection with European patent application No. 16814901.1, dated Nov. 20, 2018, 9 pages.
United States Patent and Trademark Office, "Notice of Allowance and Fee(s) Due", issued in connection with U.S. Appl. No. 15/739,489, dated Apr. 2, 2021, 5 pages.

* cited by examiner

FIG. 1

Data Flow Path Rules Table — 126a

| ND | Input Interface | Source MAC Address | Destination MAC Address | Source IP Address | Destination IP Address | Action Set | Role Tag |
|---|---|---|---|---|---|---|---|
| 1 | 1 | fa:16:3e:01:61:e8 | fa:16:3e:01:54:a3 | 10.0.0.10 | 10.0.0.20 | Send to Interface 2 | S |
| 2 | 2 | fa:16:3e:01:61:e8 | fa:16:3e:01:54:a3 | 10.0.0.10 | 10.0.0.20 | Send to Interface 4 | I |
| 4 | 1 | fa:16:3e:01:61:e8 | fa:16:3e:01:54:a3 | 10.0.0.10 | 10.0.0.20 | Send to Interface 2 | I |
| 4 | 4 | fa:16:3e:01:61:e8 | fa:16:3e:01:54:a3 | 10.0.0.10 | 10.0.0.20 | Send to Interface 3 | I |
| 5 | 3 | fa:16:3e:01:61:e8 | fa:16:3e:01:54:a3 | 10.0.0.10 | 10.0.0.20 | Send to Interface 1 | D |

SYSTEMS AND METHODS FOR ROUTING DATA USING SOFTWARE-DEFINED NETWORKS

CROSS-REFERENCE TO RELATED APPLICATIONS

This application is a continuation of U.S. patent application Ser. No. 15/739,489, filed on Dec. 22, 2017 (now U.S. Pat. No. 11,102,173), which is a national stage filing of International Application No. PCT/2016/032996 having an international filing date of May 18, 2016, which claims the benefit of Indian Application No. 3212/CHE/2015 filed Jun. 26, 2015. Priority is claimed to U.S. patent application Ser. No. 15/739,489, International Application No. PCT/2016/032996, and Indian Application No. 3212/CHE/2015. In addition, U.S. patent application Ser. No. 15/739,489, International Application No. PCT/2016/032996 and Indian Application No. 3212/CHE/2015 are incorporated herein by reference as if set forth in full.

TECHNICAL FIELD

This application relates generally to computer networks and, more particularly, to systems and methods for routing data using software-defined networks (SDNs).

BACKGROUND

Software-defined networking is a network architecture that allows network administrators to manage network services through abstraction of lower-level functionality. Software-defined networking can include a decoupling a system that makes decisions about where traffic is sent (the control plane) from underlying systems that forward traffic to the selected destination (the data plane). In a software-defined network (SDN), the network intelligence can be logically centralized in software-based SDN controllers that maintain a global view of the network, which can appear to application and policy engines as a single, logical switch. Network control can be directly programmable because it is decoupled from forwarding functions. Abstracting control from forwarding functions can allow network administrators to dynamically adjust network-wide traffic flow to meet changing needs. For example, an SDN can allow network managers to configure, manage, secure, and optimize network resources very quickly via dynamic, automated SDN applications, which may not depend on proprietary software.

While the embodiments are susceptible to various modifications and alternative forms, specific embodiments thereof are shown by way of example in the drawings and will herein be described in detail. The drawings may not be to scale. It should be understood, however, that the drawings and the detailed description thereto are not intended to limit the embodiments to the particular form disclosed, but to the contrary, the intention is to cover all modifications, equivalents, and alternatives falling within the spirit and scope of the present embodiments as defined by the appended claims.

DETAILED DESCRIPTION

The present embodiments will now be described more fully hereinafter with reference to the accompanying drawings in which example embodiments are shown. Embodiments may, however, be provided in many different forms and should not be construed as limited to the illustrated embodiments set forth herein. Rather, these example embodiments are provided so that this disclosure will be thorough and complete, and will fully convey the scope of the disclosure to those skilled in the art.

As discussed in more detail below, provided in some embodiments are systems and methods for routing data using a software-defined network (SDN). In some embodiments, role tags can be appended to (or otherwise associated with) flow rules, and these role tags can be used to efficiently identify a source network device for a data flow path. Moreover, in some embodiments, updated flow rules (e.g., blocking flow rules) can be generated for, and downloaded to, a source network device to, for example, inhibit the flow of malicious data into and/or through the SDN. Although certain embodiments are discussed in the context of an SDN for the purpose of illustration, embodiments can be employed with any suitable type of data and data networks.

When implemented through open standards, an SDN can simplify network design and operation because instructions can be provided by SDN controllers instead of multiple, vendor-specific devices and protocols. The OpenFlow™ protocol is a foundational element for building SDN solutions. OpenFlow™ is a vendor-neutral standard communications interface defined between the control and forwarding layers of an SDN architecture. In an SDN, operating in accordance with the OpenFlow™ protocol may include data path functions being executed by network devices (NDs), such as routers and switches, while control functions including high-level routing decisions are moved to a separate SDN controller, such as a network server. The NDs and the SDN controller may communicate via the OpenFlow™ protocol. In some instances, flow rules for the data path functions of an ND can include flow rules residing on the ND that dictate how data is routed through the ND. The SDN controller may maintain a table of the flow rules that are distributed to the respective NDs.

In some instances, it can be beneficial to identify the source of activity on the network. For example, if malicious activity is detected on the network, it may be beneficial for the SDN controller to determine the source of the activity, so that appropriate action can be taken, such as inhibiting the source of the malicious activity from communicating data on the network. Unfortunately, the determination of a source of activity may not be simple. For example, if malicious activity is detected (e.g., by a firewall) downstream in a data flow through NDs, the SDN controller may have to engage in additional processing, such as conducting multiple lookups, querying NDs and/or the like to determine the source of the malicious activity.

Figure 1:
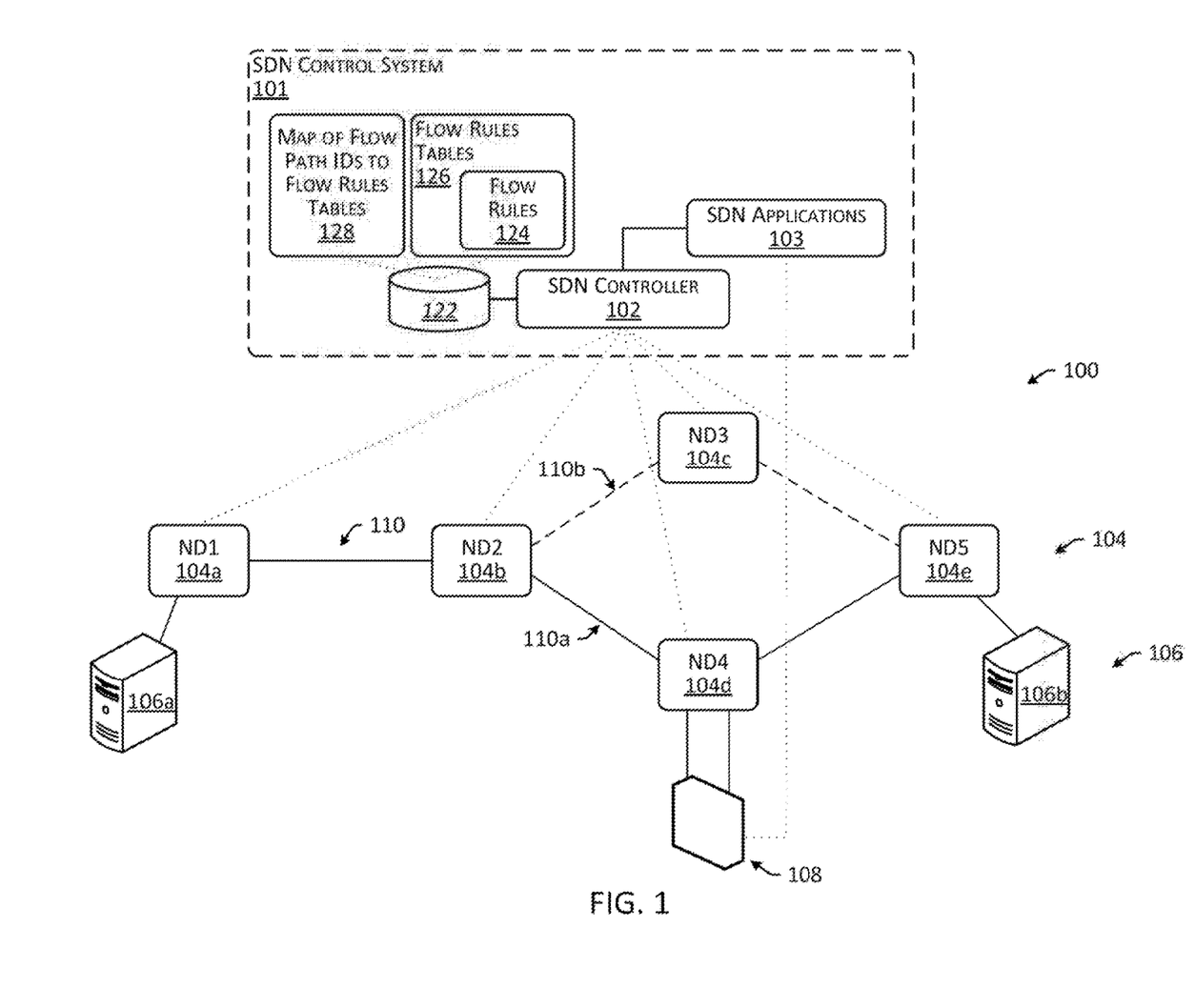
FIG. 1 is a block diagram that illustrates an example computer network environment in accordance with one or more embodiments.

In some embodiments, an SDN can include an SDN controller, and one or more network devices (NDs). For example, an SDN can include a network server that operates as the SDN controller, and one or more NDs, including routers and/or switches, that are used to route data across the network. The NDs may execute instructions received from the SDN controller to provide for the flow of data across a path (also referred to herein as a "data flow path"). The instructions can be communicated in the form of rules (also referred to herein as "flow rules") that are computed, or otherwise determined, by the SDN controller that are downloaded (or otherwise communicated) to the NDs for execution. For example, in response to being tasked with generating a data flow from a first host device (e.g., a first user computer) to a second host device (e.g., a second user computer), the SDN controller may determine a flow path that passes through four NDs (e.g., a flow path of ND1→ND2→ND4→Firewall→ND5). Referring to FIG. 1 (described in more detail below), for example, the flow path can include an input to a first interface of ND1 (e.g., for receiving data to be routed from a first host device) and an output from a second interface of ND1, an input to a second interface of ND2 and an output from a fourth interface of ND2, an input to a first interface of ND4 and an output from a second interface of ND4 (where routing data through a firewall), an input to a fourth interface of ND4 and an output from a third interface of ND4, an input to a third interface of ND5 and an output from a first interface of ND5 (e.g., for sending the routed data to the second host device).

In such a routing configuration, the first host device may be referred to as the "source host device" for the data flow, and the second host device may be referred to as a "destination host device" for the data flow. The SDN controller may generate a corresponding flow rule (or flow rules) for each ND in the data flow path. For example, the SDN controller may generate a first flow rule for ND1 that includes an action set that instructs ND1 to route data received at its first interface (e.g., from the first host device) to its second interface. In the above described data flow path, this can accommodate routing of the data from the first host device to ND2 via ND1. Similarly, the SDN controller may generate a second flow rule for ND2 that includes an action set that instructs ND2 to route data received at its second interface (e.g., from ND1) to its fourth interface. In the above described flow path, this can accommodate routing of the data from ND1 to ND4 via ND2. These flow rules can be downloaded to each of the respective NDs for execution. For example, the first flow rule may be downloaded onto ND1, and ND1 may execute the first flow rule such that any data received from the first host device on the first interface of ND1 is output to the second interface of ND1.

Figure 2:
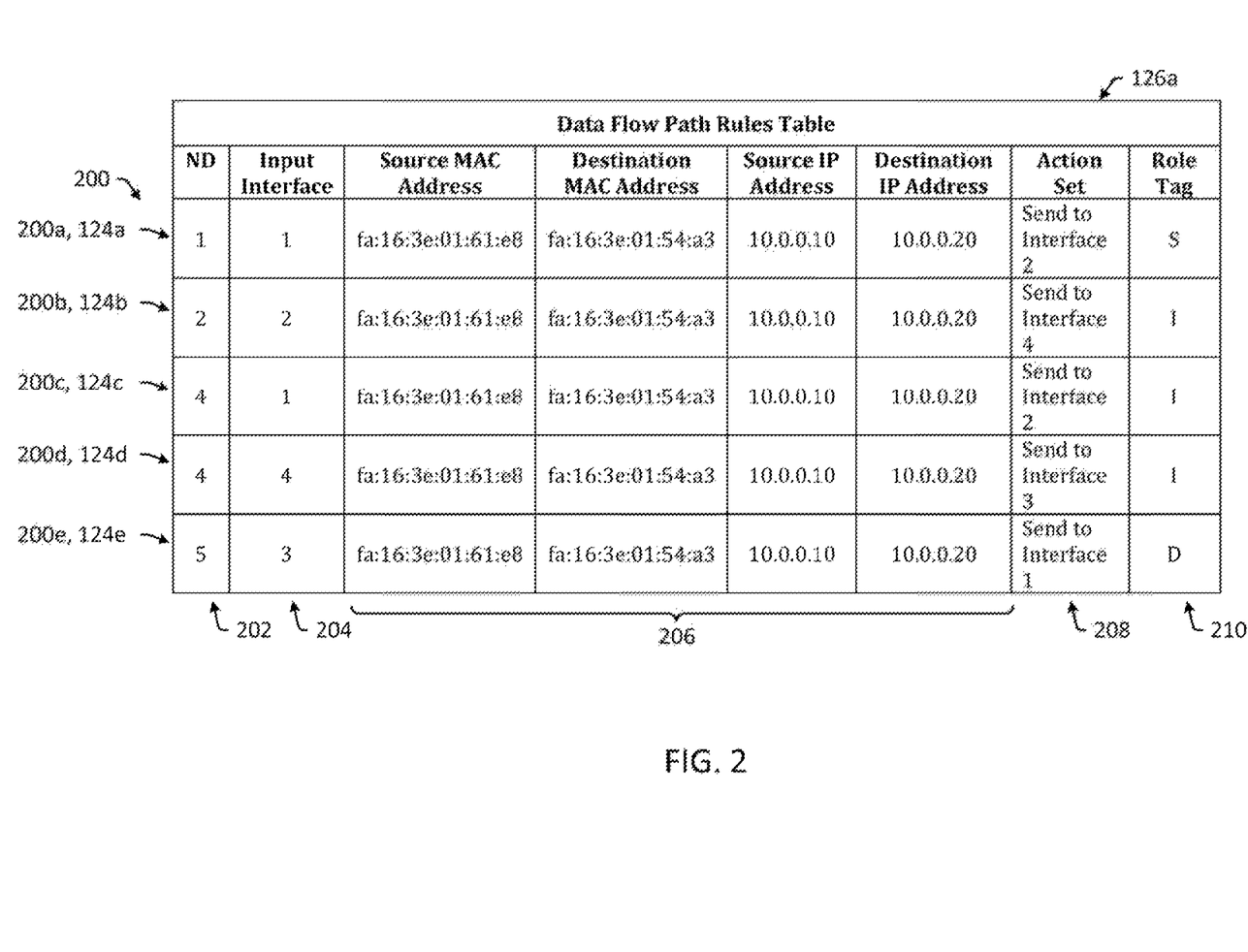
FIG. 2 is a table that illustrates an example flow rules table in accordance with one or more embodiments.

In some embodiments, the SDN controller can maintain a flow rules table that includes the flow rules. Referring to FIG. 2 (described in more detail below), for example, the SDN controller may store a flow rules table for the first data flow path that includes a first entry including the first flow rule for ND1, a second entry including the second flow rule for ND2, third and fourth entries including the third and the fourth flow rules for ND4, and a fifth entry including the fifth flow rule for ND5. In some embodiments, each of the flow rules table and the flow rules for a data flow path can be associated with a corresponding flow ID that may uniquely identify a flow. For example, the above described flow rules table for the first data flow path and the five flow rules may each be associated with the same flow ID. As described in more detail below, such a flow ID may enable the SDN controller to determine a data flow path associated with a request or other message that includes the flow ID. For example, if malicious data is detected in the data flow path by a firewall, the firewall may generate a message indicating malicious activity associated with the flow ID. The SDN controller can identify the corresponding data flow path (and associated flow rules table and/or flow rules) using the flow ID. A flow ID may uniquely identify a flow path based on a combination of a subset of fields from the packet's headers, such as media access control (MAC) addresses, IP addresses, Transmission Control Protocol (TCP) port, virtual local area network (VLAN) IDs and/or the like. In some embodiments, a flow ID can include a combination of one or more of a source media access control (MAC) address, a destination MAC address, a source IP address, and/or a destination IP address. For example, the flow ID for the first flow path may include a MAC address for the first host device (e.g., fa:16:3e:01:61:e8), a MAC address for the second host device (e.g., fa:16:3e:01:54:a3), an IP address for the first host device (e.g., 10.0.0.10), and an IP address for the second host device (e.g., 10.0.0.20). That is, for example, the flow ID for the first flow path may be "fa:16:3e:01:61:e8;fa:16:3e:01:54:a3;10.0.0.10;10.0.0.20."

In some embodiments, flow rules can be dynamically updated to reconfigure routing of data. For example, if the SDN controller determines that the data flow path from the first host device to the second host device should include ND3 as opposed to ND4 (e.g., if ND3 is determined to be unreliable or inoperable), the SDN controller may generate an updated set of flow rules for a second data flow path that is similar to the above described flow path, but that provides for routing of the data through ND3. This can include, for example, generating an updated set of flow rules that routes data from the third interface of ND2, into the second interface of ND3 and out of the first interface of ND3, and into the second interface of ND5. In a manner similar to that described above, the SDN controller may generate a flow rules table that includes the flow rules for the second flow path, and may download the updated flow rules to the respective NDs to configure them to provide the updated data flow path. In some embodiments, the SDN controller can simply allow the existing flow rules (already stored on the NDs) to expire. For example, the SDN can download the updated flow rules for the second flow path to respective ones of ND1, ND2, ND3 and ND4, and the existing flow rules for the first flow path already written to ND1, ND2, ND4 and ND5 can be allowed to expire. In some embodiments, the SDN controller can delete (or otherwise inhibit the execution of) the existing flow rules already stored on the NDs. For example, the SDN can download the updated flow rules for the second flow path to respective ones of ND1, ND2, ND3 and ND4, and the SDN can instruct some or all of ND1, ND2, ND4 and ND5 to delete the existing flow rules for the first flow path already stored thereon.

In some embodiments, a flow rule can be configured to inhibit the flow of data. For example, if the SDN controller determines that the first host device is sending malicious data to the second host device, then the SDN controller can generate a "blocking" flow rule to cause ND1 (the source ND) to block (or drop) data from the first host device that is destined for the second host device. For example, the blocking flow rule can include an action set that instructs ND1 to block (or drop) data received on the first interface that is associated with a source of the first host device and a destination of the second host device. Such a flow rule can be employed, for example, to prevent malicious data from proceeding past a source ND (e.g., ND1) in the network. For example, the SDN controller can download the blocking flow rule to ND1, and ND1 can execute the rule to block (or drop) all data received from the first host device that is destined for the second host device, such that the data is not even routed to ND2.

In some embodiments, an ND and its flow rule(s) can be associated with a role in a data flow path. A source role may indicate that the associated ND and/or flow rule is a source for the data flow path (e.g., the ND is the first ND in the data flow path and/or the rule is the first flow rule in the data flow path). A destination role may indicate that the associated ND is a destination ND for the data flow path (e.g., the ND is the last ND in the data flow path and/or the rule is the last flow rule in the data flow path). An intermediate role may indicate that the associated ND and/or flow rule is an intermediate ND of the data flow path (e.g., the ND is between the first ND and the last ND in the data flow path and/or the rule is between the first flow rule and the last flow rule in the data flow path). For example, with regard to the first data flow path, ND1 (and the first flow rule associated therewith) may be associated with a "source" role, each of ND2 and ND4 (and the second, third, and fourth flow rules associated therewith) may be associated with an "intermediate" role, and ND5 (and the fifth flow rule associated therewith) may be associated with a "destination" role.

In some embodiments, a flow rule can include or otherwise be associated with a role. For example, a flow rule can include a tag (also referred to as a "role tag") or similar indication of the role associated with the flow rule. With regard to the first data flow path, for example, the first flow rule may include a role tag of "S" (indicating a source role), the second, third, and fourth flow rules may include a role tag of "I" (indicating an intermediate role), and the fifth flow rule may include a role tag of "D" (indicating a destination role). In some embodiments, the role tag can be included in the flow rules table for the data flow path. Referring again to FIG. 2 (described in more detail below), each entry of the flow rules table for the first, second, third, fourth, and fifth flow rules of the first data flow path may, for example, include role tags of S, I, I, I, and D, respectively. In some embodiments, a role tag can be included with a flow rule downloaded to the NDs. For example, the SDN may download to ND1, the first flow rule that includes an ND designator (e.g., 1), an input interface (e.g., 1), a source MAC address (e.g., fa:16:3e:01:61:e8), a destination MAC address (e.g., fa:16:3e:01:54:a3), a source IP address (e.g., 10.0.0.10), a destination IP address (e.g., 10.0.0.20), an action (e.g., send to interface 2), and a role tag (e.g., S).

In some embodiments, a flow rules table can be generated using the flow rules distributed to NDs. For example, if the SDN controller becomes inoperable, and a second SDN controller (e.g., a back-up SDN controller) is tasked with handling the control duties for the SDN, then the second SDN controller can query each of the NDs for the flow rules stored thereon, and can construct a corresponding flow rules table. These can include, for example, replicating one or more flow rules tables that are the same or similar to those stored on the first SDN controller when it became inoperable. For example, the second SDN controller can construct a flow rules table (e.g., similar to that illustrated in FIG. 2) using the first flow rule received from ND1, the second flow rule received from ND2, the third and fourth flow rules received from ND4, and the fifth flow rule received from ND5.

In some embodiments, a role tag can be used to identify a source ND of a data flow path, and flow rules can be generated and distributed to the ND. For example, if malicious data is detected in the first data flow path by the firewall, the firewall may generate and send to the SDN controller (and/or an SDN application associated therewith), an alert message indicating the malicious activity and including alert data indicative of the potentially malicious data (e.g., header fields of packets suspected as being malicious). In response to receiving the alert message, the SDN controller (and/or the SDN application) may extract the alert data flow ID from the alert message, determine a flow ID corresponding to the alert date (e.g., a flow ID corresponding to the header fields of packets suspected as being malicious), and reference a mapping of flow rule IDs to flow rules tables to identify the flow rules table for the first data flow path using the flow ID determined using the alert message. The SDN controller may then search the entries of the flow rules table for the first data flow path to identify a flow rule of the table that includes (or is otherwise associated with) a source role tag (e.g., S). As a result of the searching, the SDN controller may identify the first flow rule (associated with ND1) as being associated with a source role tag (e.g., S), thereby identifying ND1 as the source ND for the first data flow path indicated by the flow ID determined using the alert message. The SDN controller may, further, identify the first host device as the source device for the data flow path, and identify the second host device as the destination device for the data flow path. In response to identifying the ND1 as the source ND for the first data flow path, the SDN controller may generate a flow rule to cause ND1 (the source ND) to block (or drop) data received from the first host device that is destined for the second host device. For example, the flow rule can include an action set that instructs the ND to block (or drop) data received on the first interface that is associated with a source of the first host device and a destination of the second host device. Such a flow rule can be employed, for example, to prevent malicious data from proceeding past the source ND (e.g., ND1) in the network. For example, the SDN controller can download the rule to ND1, and ND1 can execute the rule to block (or drop) all data received from the first host device that is destined for the second host device, such that the data is not even routed to ND2.

FIG. 1 is a block diagram that illustrates an example computer network environment ("environment") in accordance with one or more embodiments. The environment may include a software-defined network (SDN) 100 that includes an SDN control system 101 (e.g., including an SDN controller 102 and one or more SDN applications 103) and/or one or more network devices (NDs) 104 (e.g., network devices 104a, 104b, 104c, 104d and 104e, also referred to herein as ND1, ND2, ND3, ND4 and ND5, respectively) communicatively coupled to one another. The environment can also include one or more host devices 106 (e.g., host devices 106a and 106b) and/or a network security system 108 (e.g., a firewall) that may be part of the SDN control system 101. As described herein, in some embodiments, the SDN control system 101 can be configured for routing data along one or more data flow paths 110. For example, the SDN control system 101 can be configured for routing data from the host device 106a to the host device 106b via a first flow path 110a (e.g., that passes through ND1, ND2, ND4, and ND5) and/or a second data flow path 110b (e.g., that passes through ND1, ND2, ND3, and ND5).

In some embodiments, the SDN controller 102 can include any variety of computer devices. For example, the SDN controller 102 may include a network server. In some embodiments, the SDN controller 102 can include one or more computer systems similar to the computer system 1000 described herein with regard to at least FIG. 6. In some embodiments, the SDN controller 102 is a logically centralized entity in charge of (i) translating the requirements from the SDN Application layer (e.g., SDN applications 103) down to the SDN datapaths (e.g., NDs 104) and (ii) providing the SDN applications 103 with an abstract view of the network (which may include statistics and events). The SDN controller 102 can include one or more northbound interface (NBI) agents, the SDN control logic, and a control-to-data-plane interface (CDPI) driver, and/or the like. In some embodiments, the SDN controller 102 can include programs or other logic for generating flow rules 124, generating flow rules tables 126, generating mappings of flow IDs to flow rules tables 128, downloading of flow rules 124 to respective ones of the NDs 104, and/or the like. In some embodiments, the SDN controller 102 may employ one or more suitable protocols (e.g., the OpenFlow™ protocol, the network configuration protocol (NETCONF), and/or the like) for communicating with other devices of the SDN control system 101, such as the NDs 104.

In some embodiments, an SDN application 103 can include a program that explicitly, directly, and/or programmatically communicates its network requirements and desired network behavior to the SDN controller 102 via a northbound interface (NBI). An SDN application 103 may include, for example, SDN application logic and one or more NBI application program interface (API) libraries. An SDN application 103 may include, for example, a program for network virtualization, network monitoring, intrusion detection (IDS), flow balancing (the SDN equivalent of load balancing), and/or the like. In some embodiments, an SDN application 103 may be stored in data store 122. In some embodiments, an SDN application 103 may be executed by the SDN controller 102 to provide some or all of the functionality described herein with regard to the SDN controller 102 and/or the SDN applications 103. In some embodiments, an SDN application 103 can be executed by any variety of computer devices, such as one or more application servers of the SDN control system 101.

In some embodiments, an ND 104 can include a device for routing signals, such as a switch or a router. In some embodiments, an ND 104 can include one or more computer systems similar to the computer system 1000 described herein with regard to at least FIG. 6. An ND 104 may be referred to as an "SDN datapath." An ND 104 may include a logical network device that exposes visibility and uncontended control over its advertised forwarding and data processing capabilities. The logical representation may encompass all or a subset of the physical substrate resources. An ND 104 may include a control-to-data-plane interface (CDPI) agent and a set of one or more traffic forwarding engines and zero or more traffic processing functions. These engines and functions may include simple forwarding between external interfaces or internal traffic processing or termination functions of the ND 104. One or more NDs 104 may be contained in a single (physical) network element—an integrated physical combination of communications resources, managed as a unit. An ND 104 may also be defined across multiple physical network elements.

In some embodiments, a host device 106 can include any variety of computer devices capable of communicating via the SDN control system 101. A host device 106 can include, for example, a desktop computer, a laptop computer, a mobile phone (e.g., a smartphone), a server, and/or the like.

Figure 6:
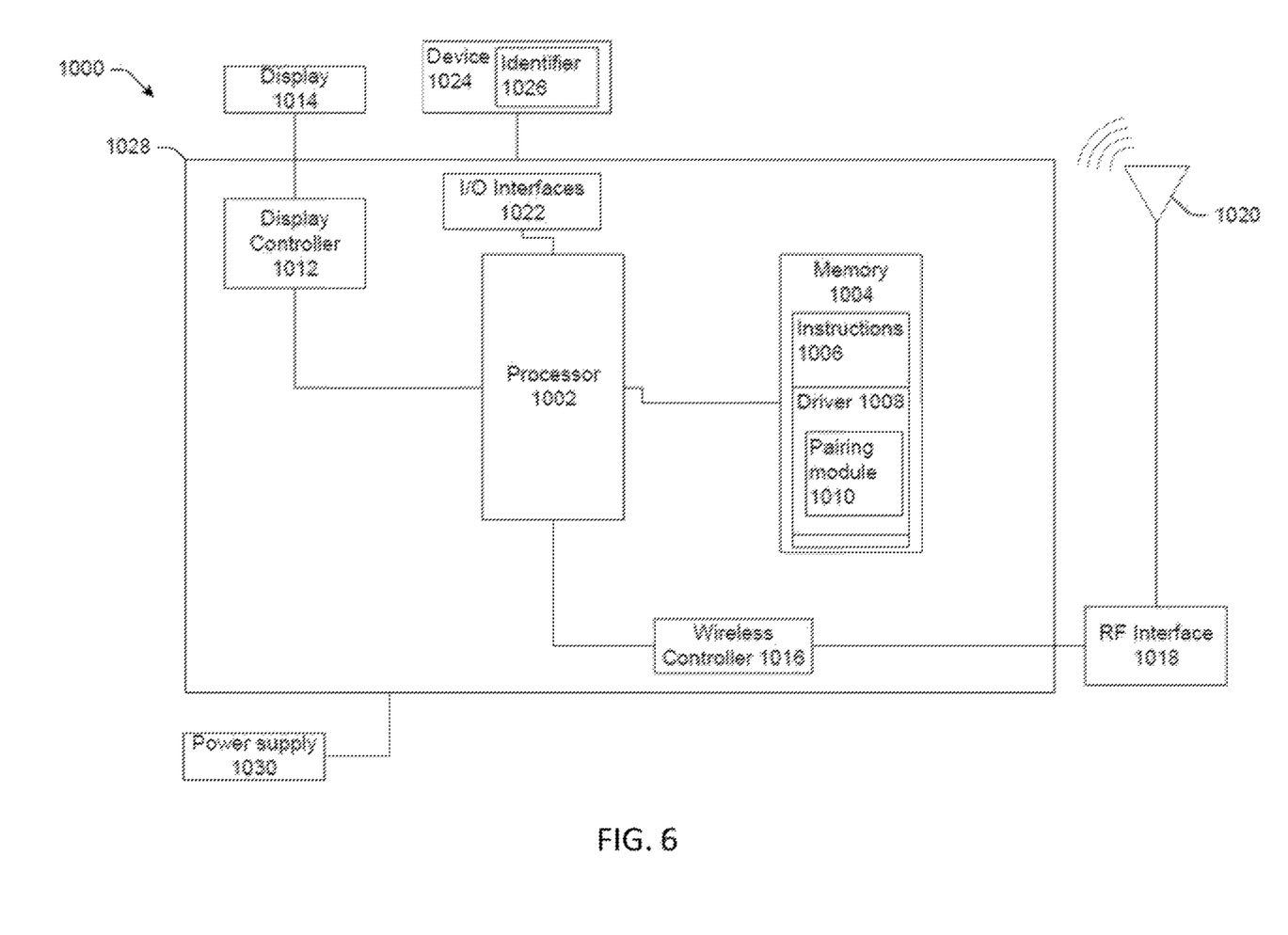
FIG. 6 is a block diagram that depicts an example computer system in accordance with one or more embodiments.

In some embodiments, a host device 106 can include one or more computer systems similar to the computer system 1000 described herein with regard to at least FIG. 6.

In some embodiments, a network security system 108 can include one or more components (e.g., hardware and/or software) that are employed to improve security of the SDN control system 101. A network security system 108 can include, for example, an anti-virus system, an anti-spyware system, a firewall system (e.g., to block unauthorized access to a network), an intrusion prevention system (IPS) (e.g., to identify fast-spreading threats, such as zero-day or zero-hour attacks), a virtual private network (VPN) (e.g., to provide secure remote access), and/or the like. In some embodiments, a network security system 108 is communicatively coupled to one or more SDN applications 103. For example, as described herein, a firewall network security system 108 may send alert messages to an SDN application 103 that indicate malicious activity occurring on a data flow path 110 of the SDN control system 101. As further described herein, such alert messages can be processed by the SDN application 103, the SDN application 103 may communicate a corresponding message to the SDN controller 102, and the SDN controller 102 may generate and distribute one or more flow rules 124 to inhibit the malicious activity.

In some embodiments, the SDN controller 102 can include (or otherwise have access to) a data store 122. The data store 122 may store one or more flow rules 124, one or more flow rules tables 126, a mapping of flow IDs to flow rules tables 128, and/or the like.

In some embodiments, a flow rule 124 can include a rule that specifies how data is to be routed by an ND 104. For example, a flow rule 124 may specify that an ND 104 is to receive data at a first interface of the ND 104 and output data on a second interface of the ND 104. Such a flow rule 124 may be downloaded to and reside on an ND 104 (e.g., stored in a memory or other location of an ND 104), and may be executed by the ND 104 to cause data received via the first interface to be output on the second interface of the ND 104. In some embodiments, a flow rule 124 can include an ND designator (e.g., indicating the ND 104 by which the flow rule 124 is to be employed), an input interface (e.g., an interface of the ND for receiving data), a flow ID (e.g., one or more values that uniquely identify the data flow path 110 to which the flow rule 124 corresponds), an action set (e.g., instructions defining how the received data is to be routed or otherwise disposed of), and/or a role tag (e.g., identifying a role associated with the rule, such as source (S), intermediate (I), or destination (D)). In some embodiments, a flow rules set for a data flow path 110 includes some or all of the flow rules 124 that define the data flow path 110. In some embodiments, a flow rules table 126 can include a listing of some or all of the flow rules 124 managed by an SDN controller 102. A flow rules table 126 for a particular data flow path 110 can include, for example, a listing of the flow rules set for the data flow path 110.

FIG. 2 illustrates an example flow rules table 126a in accordance with one or more embodiments. The table 126a includes five entries 200 (e.g., entries 200a, 200b, 200c, 200d and 200e) defining at least a portion of corresponding flow rules 124 (e.g., flow rules 124a, 124b, 124c, 124d and 124e). Each flow rule 124 includes an ND designator 202, an input interface 204, a flow ID (ID) 206, an action set 208, and a role tag 210. The flow ID 206 may be a combination of one or more values, such as a combination of one or more of a source MAC address, a destination MAC address, a source IP address, and/or a destination IP address (e.g., fa:16:3e:01:61:e8;fa:16:3e:01:54:a3;10.0.0.10; The flow rules table 126a may include a first entry 200a including a first flow rule 124a for ND1 104a, a second entry 200b including a second flow rule 124b for ND2 104b, third and fourth entries 200c and 200d including third and fourth flow rules 124c and 124d for ND4 104d, and a fifth entry 200e including a fifth flow rule 124e for ND5 104e. In some embodiments, some or all of one or more flow rules 124 (including role tags 210) can be provided to indicate the network devices 104 that a flow passed through, and the role of each of the network devices 104. For example, in response to a user request to view the network devices 104 in the flow path 110a, the user may be presented with a table similar to that of flow rules table 126a of FIG. 2, including at least the first column of ND designators 202 (indicating respective network devices 104) and the last column of role tags 210 (indicating respective roles of the network devices 104).

In some embodiments, a mapping of flow IDs to flow rules tables 128 can include a mapping or association of one or more flow IDs 206 to one or more corresponding flow rules tables 126 stored in data store 122. For example, a mapping of flow IDs to flow rules tables 128 can include a mapping (or association of) the flow ID 206 of "fa:16:3e: 01:61:e8;fa:16:3e:01:54:a3;10.0.0.10;10.0.0.20" to the table 126a illustrated in FIG. 2. Thus, for example, the SDN controller 102 can quickly retrieve the table 126a from the data store 122 if, for example, it is tasked with a request for the flow path 110 having the flow ID 206 of "fa:16:3e:01: 61:e8;fa:16:3e:01:54:a3;10.0.0.10;10.0.0.20." Similar mappings can be provided for any number of flow IDs 206 for data flow paths 110 and corresponding flow rules tables 126 for the data flow paths 110.

Figure 3:
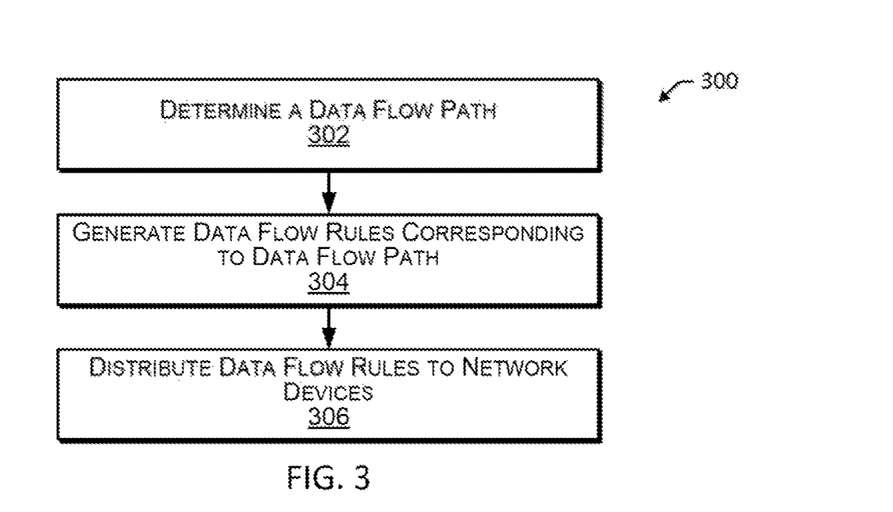
FIG. 3 is a flowchart that illustrates an example method for distributing flow rules to network devices in accordance with one or more embodiments.

FIG. 3 is a flowchart that illustrates an example method 300 for distributing flow rules to NDs in accordance with one or more embodiments. Method 300 can generally include determining a data flow path (block 302), generating one or more data flow rules corresponding to the data flow path (block 304), and distributing the one or more data flow rules to network devices (block 306). In some embodiments, some or all of the operations described with regard to the method 300 can be performed by the SDN controller 102 and/or one or more of the SDN applications 103.

In some embodiments, determining a data flow path (block 302) can include the SDN controller 102 determining a flow path to route data between two or more host devices 106. For example, determining a data flow path can include the SDN controller 102 determining the first flow path 110a (e.g., that passes through ND1, ND2, ND4, and ND5) for routing data from the host device 106a to the host device 106b (e.g., a data flow path of ND1→ND2→ND4→Firewall→ND5). The data flow path can include an input to a first interface of ND1 104a (e.g., for receiving data to be routed from the first host device 106a) and an output from a second interface of ND1 104a, an input to a second interface of ND2 104b and an output from a fourth interface of ND2 104b, an input to a first interface of ND4 104d and an output from a second interface of ND4 104d (where it is routed through a network security system 108), an input to a fourth interface of ND4 104d and an output from a third interface of ND4 104d, an input to a third interface of ND5 104e and an output from a first interface of ND5 104e (e.g., for providing the routed data to the second host device 106b). In such a routing configuration, the first host device 106a may be referred to as a "source host device" for the data flow path 110a, and the second host device 106b may be referred to as a "destination host device" for the data flow path 110a.

In some embodiments, generating one or more data flow rules corresponding to the data flow path (block 304) can include the SDN controller 102 generating a corresponding flow rule (or flow rules) 124 for each ND 104 in the data flow path 110. For example, with regard to the first data flow path 110a, the SDN controller 102 may generate a first flow rule 124a for ND1 104a. The first flow rule 124a may include an action set 208 that instructs ND1 104a to route data received at its first interface (e.g., from host device 106a) to its second interface. In the data flow path 110a, this can accommodate routing of the data from the first host device 106a to ND2 104b via ND1 104a. Similarly, the SDN controller 102 may generate a second flow rule 124b for ND2 104b that includes an action set 208 that instructs the ND2 to route data received at its second interface (e.g., from ND1 104a) to its fourth interface. In the data flow path 110a, this can accommodate routing of the data from ND1 104a to ND4 104d via ND2 104b. The SDN controller 102 may generate flow rules 124 for each of the NDs 104 in the data flow path 110a in a similar manner. For example, the SDN controller 102 may generate the third and fourth flow rules 124c and 124d for ND4 104d, and the fifth flow rule 124e for ND4 104e. In some embodiments, each of the flow rules 124 can include a role tag 210 or similar indication of a role associated with the flow rule 124. With regard to the first data flow path 110a, for example, the first flow rule 124a may include a role tag 210 of "S" (indicating a source role), the second, third, and fourth flow rules 124b, 124c, and 124d may include a role tag 210 of "I" (indicating an intermediate role), and the fifth flow rule 124e may include a role tag 210 of "D" (indicating a destination role). In some embodiments, the SDN controller 102 may store the one or more flow rules 124 locally (e.g., in the data store 122). For example, the SDN controller 102 may generate and store in data store 122, a flow rules table 126 that is the same or similar to that of table 126a illustrated and described with regard to FIG. 2.

In some embodiments, distributing the one or more data flow rules to network devices (block 306) can include the SDN controller 102 downloading (or otherwise providing) the one or more flow rules 124 to each of the respective NDs 104. For example, the SDN controller 102 may download the first flow rule 124a to ND1 104a, download the second flow rule 124b to ND2 104b, download the third and fourth flow rules 124c and 124d to ND4 104d, and download the fifth flow rule 124e to ND5 104e. In some embodiments, the role tags 210 can be included with the flow rule 124 downloaded to the NDs. For example, the SDN controller 102 may download to ND1 104a, the first flow rule 124a that includes an ND designator 202 (e.g., 1), an input interface 204 (e.g., 1), a data flow ID 106 including a source MAC address (e.g., fa:16:3e:01:61:e8), a destination MAC address (e.g., fa:16:3e:01:54:a3), a source IP address (e.g., 10.0.0.10), a destination IP address (e.g., 10.0.0.20), an action set 208 (e.g., send to interface 2), and a role tag 210 (e.g., S). As described herein, each of the NDs 104 may execute the respective flow rules 124 to configure the ND 104 to provide at least a segment of the corresponding data flow path 110. For example, the NDs 104a, 104b, 104d and 104e may execute respective ones of the flow rules 124a, 124b, 124c, 124d and 124e to route data from the first host device 106a to the second host device 106b along the data flow path 110a.

Figure 4:
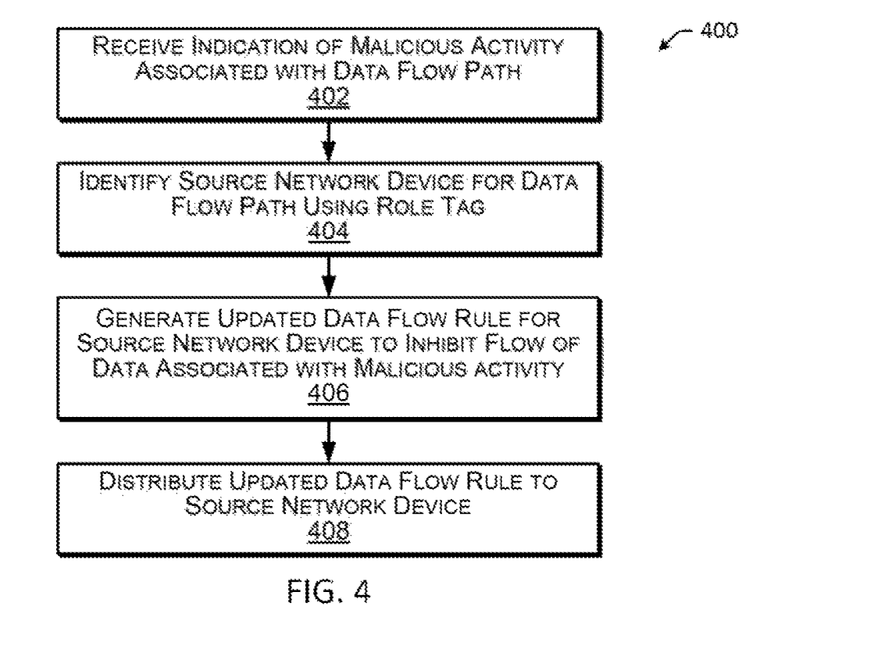
FIG. 4 is a flowchart that illustrates an example method for distributing updated flow rules to network devices in accordance with one or more embodiments.

FIG. 4 is a flowchart that illustrates an example method 400 for distributing updated flow rules to network devices in accordance with one or more embodiments. Method 400 can generally include receiving an indication of malicious activity associated with the data flow path (block 402), identifying a source network device for the data flow path using one or more role tags (block 404), generating one or more updated data flow rules for the source network device to inhibit flow of data associated with malicious activity (block 406), and distributing the updated data flow rule to the source network device (block 408). In some embodiments, some or all of the operations described with regard to method 400 can be performed by the SDN controller 102 and/or one or more of the SDN applications 103.

In some embodiments, receiving an indication of malicious activity associated with the data flow path (block 402) can include the SDN controller 102 and/or an SDN application 103 receiving an indication of malicious activity associated with a data flow path 110. For example, if malicious data is detected in the first data flow path 110a by a network security system 108, the network security system 108 may generate and send an alert message to an SDN application 103. The alert message may indicate the malicious activity and include alert data indicating the data flow ID 206 for the first data flow path 110a (e.g., fa:16:3e:01:61:e8;fa:16:3e:01:54:a3;10.0.0.10;10.0.0.20). The SDN application 103 may send a corresponding alert message to the SDN controller 102 that indicates the malicious activity and/or includes a request that the SDN controller 102 block the flow of data across the data flow path 110a. That is, the SDN controller 102 may receive an alert message that may include a request to block the flow of data flow path 110a that is associated with the malicious activity.

In some embodiments, identifying a source network device for the data flow path using one or more role tags (block 404) can include the SDN controller 102 identifying a flow rule 124 and/or a network device 104 of the data flow path 110 that is associated with a "source" role based at least in part on the one or more role tags 210 associated with the flow rules 124 for the data flow path 110. For example, in response to receiving an alert message indicating the malicious activity and/or including a request that the SDN controller 102 block the flow of data flow path 110a, the SDN controller 102 may determine the flow ID 206 (e.g., fa:16:3e:01:61:e8;fa:16:3e:01:54:a3;10.0.0.10;10.0.0.20) using the alert message, and reference the mapping of flow IDs to flow rules tables 128 to identify the flow rules table 126 (e.g., the table 126a illustrated in FIG. 2) for the first data flow path 110a using the flow ID 206. The SDN controller 102 may, then, search the entries of the flow rules table 126a for the first data flow path 110a to identify a flow rule 124 of the table 126a that includes (or is otherwise associated with) a source role tag 210 (e.g., the flow rule 124a of the table 126a that includes a role tag 210 having a value of "S"). As a result of the searching, the SDN controller 102 may identify the first flow rule 124a (associated with ND1 104a) as being associated with a source role tag 210 (e.g., S), and may identify ND1 104a as the source ND 104 for the first data flow path 110a.

In some embodiments, generating one or more updated data flow rules for the source network device to inhibit the flow of data associated with malicious activity (block 406) can include the SDN controller 102 generating one or more updated flow rules 124 that can be downloaded to and executed by a source ND 104 to inhibit the flow of data via the data flow path 110. For example, in response to identifying ND1 104a as the source ND 104 for the first data flow path 110a, the SDN controller 102 may generate a blocking flow rule 124 to cause ND1 104a to block (or drop) data received from the first host device 106a that is destined for the second host device 106b. For example, the blocking flow rule 124 can include an ND designator 202 of "1," an input interface 204 of "1," a flow ID 206 of "fa:16:3e:01:61:e8;fa:16:3e:01:54:a3;10.0.0.10;10.0.0.20" an action set 208 that instructs ND1 104a to block (or drop) data received on the first interface that is associated with the host device 106a and that is destined for the host device 106b, and a role tag 210 of "S." Such a blocking flow rule 124 can be employed, for example, to prevent malicious data from proceeding past the source ND 104 (e.g., ND1 104a) in the SDN control system 101.

In some embodiments, distributing the updated data flow rule to the source network device (block 408) can include the SDN controller 102 downloading (or otherwise communicating) the flow rule 124 to the source ND 104. For example, the SDN controller 102 may download the blocking flow rule 124 (e.g., having the characteristics described above) to ND1 104a. As described herein, ND1 104a can execute the blocking rule 124 to cause blocking (or dropping) all data received from the first host device 106a that is destined for the second host device 106b. Thus, such data may not even be routed to ND2 104b.

Figure 5:
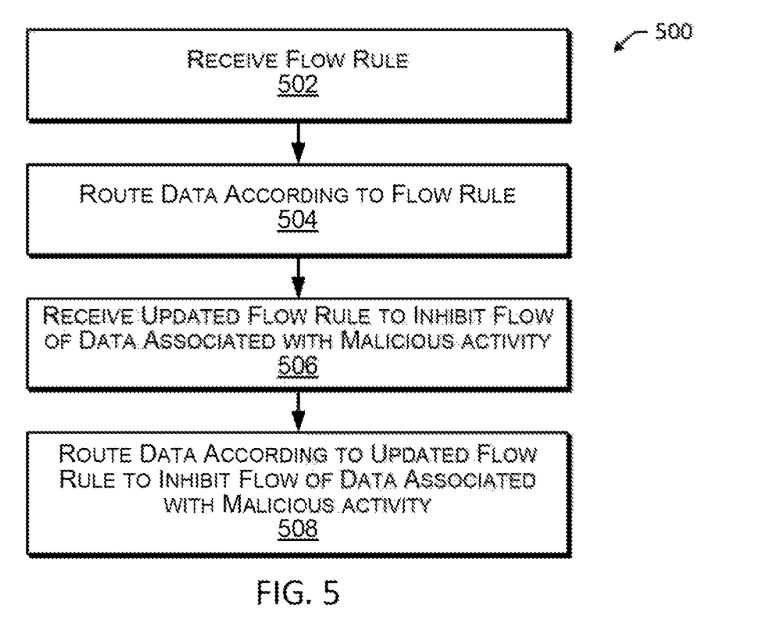
FIG. 5 is a flowchart that illustrates an example method for routing data in accordance with one or more embodiments.

FIG. 5 is a flowchart that illustrates an example method 500 for routing data in accordance with one or more embodiments. Method 500 can generally include receiving one or more flow rules (block 502), routing data according to the one or more flow rules (block 504), receiving one or more updated flow rules to inhibit the flow of data associated with malicious activity (block 506), and routing data according to the one or more updated flow rules to inhibit the flow of the data associated with malicious activity (block 508). In some embodiments, some or all of the operations described with regard to method 500 can be performed by one or more NDs 104.

In some embodiments, receiving one or more flow rules (block 502) can include an ND 104 receiving one or more flow rules 124 from the SDN controller 102. For example, ND1 104a may receive the first flow rule 124a from the SDN controller 102, and may store or otherwise retain the flow rule 124a locally (e.g., in a memory of ND1 104a). Thus, the flow rule 124a may reside on ND1.

In some embodiments, routing data according to the one or more flow rules (block 504) can include the ND 104 routing data according to the one or more flow rules 124 received from the SDN controller 102. For example, ND1 104a may execute the first flow rule 124a, thereby causing it to route data received at its first interface (e.g., from the first host device 106a) to its second interface for output (e.g., for output to ND2). In the above described data flow path 110a, this can accommodate routing of the data from the first host device 106a to ND2 104b via ND1 104a.

In some embodiments, receiving one or more updated flow rules to inhibit the flow of data associated with malicious activity (block 506) can include an ND 104 receiving one or more blocking flow rules 124 from the SDN controller 102. For example, ND1 104a may receive a blocking flow rule 124 from the SDN controller 102, and may store or otherwise retain the flow rule 124 locally (e.g., in a memory of ND1 104a). Thus, the blocking flow rule 124 may reside on ND1. The blocking flow rule 124 may include an ND designator 202 of "1," an input interface 204 of "1," a flow ID 206 of "fa:16:3e:01:61:e8;fa:16:3e:01:54:a3;10.0.0.10;10.0.0.20," an action set 208 that instructs ND1 104a to block (or drop) data received on the first interface that is associated with the host device 106a) that is destined for host device 106b, and a role tag of "S."

In some embodiments, routing data according to the one or more updated flow rules to inhibit the flow of data associated with malicious activity (block 508) can include the ND 104 routing data according to the one or more blocking flow rules 124 received from the SDN controller 102. For example, ND1 104*a* may execute the blocking flow rule 124, thereby causing it to block (or drop) all data received from the first host device 106*a* that is destined for the second host device 106*b*. Thus, such data may not even be routed to ND2 104*b*.

Accordingly, provided in some embodiments are systems and methods for routing data using a software-defined network (SDN) 100. In some embodiments, role tags 210 can be appended to (or otherwise associated with) flow rules 124, and these roles tags 210 can be used to efficiently identify a source network device 104 for a data flow path 110. Moreover, in some embodiments, updated flow rules 124 (e.g., blocking flow rules 124) can be generated for (and downloaded to) a source network device 104 to, for example, inhibit the flow of malicious data into and/or through the SDN control system 101.

FIG. 6 is a block diagram that depicts an example computer system (or "computer") 1000 in accordance with one or more embodiments. The computer 1000 may include a server, a network router, a network switch, a desktop computer, a laptop computer, a tablet computer, a mobile phone (e.g., a smartphone), a personal digital assistant (PDA), a media player, a game console, a vehicle-mounted computer, or the like. The computer 1000 may include a processor 1002 and a non-transitory computer-readable medium (e.g., a memory 1004) coupled to the processor 1002. The memory 1004 may include instructions 1006 executable by the processor 1002.

The processor 1002 may provide the processing capability to execute the operating system, programs, user interface, and other functions of the computer 1000. The processor 1002 may include one or more processors and may include microprocessors, application-specific integrated circuits (ASICs), or any combination thereof. In some embodiments, the processor 1002 may include one or more reduced instruction set computer (RISC) processors, such as those implementing the Advanced RISC Machine (ARM) instruction set. Additionally, the processor 1002 may include single-core processors and multicore processors and may include graphics processors, video processors, and related chip sets. Multiple processors may be employed to provide for parallel or sequential execution of the techniques described herein. Processes, such as logic flows, described herein may be performed by the processor 1002 executing one or more computer programs to perform functions by operating on input data and generating corresponding output.

The memory 1004 (which may include one or more tangible non-transitory computer-readable storage mediums) may include volatile memory and non-volatile memory accessible by the processor 1002 and other components of the computer 1000. The memory 1004 may store a variety of information and may be used for a variety of purposes. For example, the memory 1004 may store executable computer code, such as the firmware for the computer 1000, an operating system for the computer 1000, and any other programs or other executable code for providing functions of the computer 1000. The processor 1002 may be configured to or may execute the instructions 1006 to perform the methods and processes described in detail herein. For example, the memory 1004 may store instructions or other logic for performing some or all of the functions described herein with regard to the SDN controller 102, the SDN applications 103, the network devices 104, and/or the host devices 106.

As mentioned above, the memory 1004 may include volatile memory, such as random access memory (RAM). The memory 1004 may also include non-volatile memory, such as read-only memory (ROM), flash memory, a hard drive, other suitable optical, magnetic, or solid-state storage mediums, or any combination thereof. The memory 1004 may store data files such as media (e.g., music and video files), software (e.g., for implementing functions on the computer 1000), user preference information, payment transaction information, wireless connection information, contact information (e.g., an address book), and any other suitable data.

A display controller 1012 may be coupled to the processor 1002 and to a display device, e.g., display 1014. In some embodiments, the display 1014 may include a liquid crystal display (LCD), an organic light-emitting diode (OLED) display, or other display types. In some embodiments, the display 1014 may include a touchscreen. The display 1014 may display a user interface (e.g., a graphical user interface) executed by the processor 1002 of the computer 1000. The display 1014 may also display various indicators to provide feedback to a user, such as power status, call status, memory status, network status etc. As described above, in some embodiments, the instructions 1006 may provide for the display of visual notifications on the display 1014 via the display controller 1012, such as when an external device is connected to the computer 1000.

A wireless controller 1016 may be coupled to the processor 1002, to a radio frequency (RF) interface 1018 (e.g., a transceiver), and/or to a wireless antenna 1020. In some embodiments, the wireless controller 1016 may implement any suitable communications standard, protocol and technology, including Ethernet, Global System for Mobile Communications (GSM), Enhanced Data GSM Environment (EDGE), a 3G network (e.g., based upon the IMT-2000 standard), high-speed downlink packet access (HSDPA), wideband code division multiple access (W-CDMA), code division multiple access (CDMA), time division multiple access (TDMA), a 4G network (e.g., IMT Advanced, Long-Term Evolution Advanced (LTE Advanced), etc.), Bluetooth, Wireless Fidelity (Wi-Fi) (e.g., IEEE 802.11 standards), voice over Internet Protocol (VoIP), Wi-Max, or any other suitable communications standards, protocols, and technologies. FIG. 10 also depicts an input/output (I/O) interface 1022. The I/O interface 1022 may include multiple interfaces and may enable communication between various components of the computer 1000 and the processor 1002. The I/O interface 1022 may implement various types of interfaces, such as Peripheral Component Interconnect (PCI) interfaces, the Universal Serial Bus (USB) interfaces, Thunderbolt interfaces, Firewire (IEEE-1394) interfaces, and so on. The I/O interface 1022 may include a network interface that may communicate with networks, such as the Internet, an intranet, a cellular telephone network, a wide area network (WAN), a local area network (LAN), a metropolitan area network (MAN), or other networks. In some embodiments, such a network interface may implement Ethernet for network communications. An external device 1024 may be coupled to the computer 1000. The external device 1024 may be physically coupled to the computer 1000 via a wired interface or may be wirelessly coupled to the computer 1000 via a wireless interface. The external device 1024 may include multiple devices and may include input devices, output devices, or input/output devices. In some embodiments, the external device 1024 may include a solid state drive (also referred to as a "flash drive") (e.g., a thumb drive), a keyboard, a mouse, a camera (e.g., a webcam), a microphone, a gaming controller (e.g., a gamepad, a joystick, etc.), a trackball, a foot pedal, a head-mounted display, a portable hard drive, a portable DVD drive, a printer, a scanner, an all-in-one, and other suitable devices. In some embodiments, the external device 1024 may include an identifier 1026 stored on a memory of the external device 1024. In some embodiments, the identifier 1026 may be provided by firmware stored on a memory of the external device 1024. The identifier 1026 may include an identification of the type of external device 1024, such as whether the external device 1024 is a keyboard, a mouse, a flash drive, and so on. In some embodiments, the identifier 1026 may include a manufacturer identifier, a product name, a product line, or any combination thereof.

In some embodiments, some or all of the components of the computer system 1000 can be included in a system-in-package or system-on-chip (SOC). For example, the processor 1002, the display controller 1012, the memory 1004, and the wireless controller 1016 may be included in a system-in-package or system-on-chip (SOC) device 1028 (e.g., integrated onto an integrated circuit). A power supply 1030 may be coupled to the system-on-chip device 1028. Moreover, the display 1014, the RF interface 1018, the wireless antenna 1020, and the power supply 1030 may be external to the system-on-chip device 1028. Each of the display 1014, the RF interface 1018, the wireless antenna 1020, and the power supply 1030 may be coupled to a component of the system-on-chip device 1028, such as an interface or a controller.

It will be appreciated that the processes and methods described herein are example embodiments of processes and methods that may be employed in accordance with the techniques described herein. The processes and methods may be modified to facilitate variations of their implementation and use. The order of the processes and methods and the operations provided therein may be changed, and various elements may be added, reordered, combined, omitted, modified, etc. Portions of the processes and methods may be implemented in software, hardware, or a combination thereof. Some or all of the portions of the processes and methods may be implemented by one or more of the processors/modules/applications described herein.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described herein are to be taken as examples of embodiments. Elements and materials may be substituted for those illustrated and described herein, parts and processes may be reversed or omitted, and certain features of the embodiments may be utilized independently, all as would be apparent to one skilled in the art after having the benefit of this description of the embodiments. Changes may be made in the elements described herein without departing from the spirit and scope of the embodiments as described in the following claims. Headings used herein are for organizational purposes only and are not meant to be used to limit the scope of the description.

Accordingly, provided in some embodiments is a network controller system. The system can include a processor and a memory comprising program instructions executable by the processor to: determine a data flow path for routing data from a first network device to a second network device, wherein the data flow path comprises a plurality of network devices; determine, for at least the first network device of the network devices, one or more flow rules that specify an input of the network device for receiving data, an output of the network device for outputting data, and a role tag indicative of a role of the network device in the data flow path, wherein the role tag for one or more flow rules for a first network device of the network devices indicates a source role; distribute, to at least the first network device of the network devices of the data flow path, the one or more flow rules determined for the network device; determine malicious activity on the data flow path; determine that the first network device is a source for the data flow path based at least in part on the role tag for the first network device; and send, to the first network device and in response to determining the first network device is a source for the data flow path, a blocking flow rule to inhibit the first network device from routing malicious data.

In some instances, the program instructions can be further executable by the processor to (or a method can further include): send, to one or more of the network devices, a request for the one or more flow rules for the data flow path that are stored on the network device; receive, from the one or more of the network devices, one or more flow rules for the data flow path; and generate a flow rules table for the data flow path using the received one or more flow rules for the data flow path.

The first network device can be a network device that receives data from the first network device in the data flow path. The role tag for one or more flow rules for a second network device of the network devices may indicate a destination role. The second network device can be a last network device in the data flow path that routes data to the second network device. The role tag for one or more flow rules for one or more network devices of the network devices can indicate an intermediate role. The one or more network devices of the network devices can be located between the first network device and the last network device in the data flow path.

The network controller system can comprises a network controller for a software-defined network (SDN) comprising the network devices. The program instructions can be further executable by the processor to store the one or more flow rules for the network devices in a memory of the network controller for the SDN. The network controller may comprise a server. At least one of the network devices can comprise at least one of a network switch or a network router. The blocking flow rule can comprises a flow rule comprising an action to block or drop data received from the first network device.

Determining the malicious activity on the data flow path can comprise receiving an indication of routing of malicious data on the data flow path. The indication of routing of malicious data on the data flow path can be received from a network security system. The network security system can comprises at least one of a firewall system, an anti-virus system, an anti-spyware system, or an intrusion prevention system (IPS).

The data flow path can be associated with a flow identifier (ID), and determining the routing of malicious data on the data flow path can comprise receiving an indication of malicious activity associated with the flow ID. The flow ID can comprise an identity of the first network device. The flow ID can comprise at least one of a media access control (MAC) address of the first network device, or an internet protocol (IP) address of the first network device. The flow ID can comprise an identity of the second network device. The flow ID can comprise: at least one of a media access control (MAC) address of the first network device or an internet protocol (IP) address of the first network device; and at least one of a MAC address of the second network device or an IP address of the second network device. The program instructions can be further executable by the processor to (or a method can further include): in response to receiving a request to view network devices in the data flow path, presenting a listing of the network devices in the data flow path comprising roles tags indicative of the respective roles of the network devices.

Provided in some embodiments is a non-transitory computer-readable storage medium having computer-executable program instructions stored thereon that are executable by a computer to: determine a data flow path for routing data from a first network device to a second network device, wherein the data flow path comprises a plurality of network devices; determine, for at least the first network device of the network devices, one or more flow rules that specify an input of the network device for receiving data, an output of the network device for outputting data, and a role tag indicative of a role of the network device in the data flow path, wherein the role tag for one or more flow rules for a first network device of the network devices indicates a source role; distribute, to at least the first network device of the network devices of the data flow path, the one or more flow rules determined for the network device; determine malicious activity on the data flow path; determine that the first network device is a source for the data flow path based at least in part on the role tag for the first network device; and send, to the first network device and in response to determining the first network device is a source for the data flow path, a blocking flow rule to inhibit the first network device from routing malicious data.

In some instances, the program instructions can be further executable by the processor to: send, to one or more of the network devices, a request for the one or more flow rules for the data flow path that are stored on the network device; receive, from the one or more of the network devices, one or more flow rules for the data flow path; and generate a flow rules table for the data flow path using the received one or more flow rules for the data flow path.

The first network device can be a network device that receives data from the first network device in the data flow path. The role tag for one or more flow rules for a second network device of the network devices may indicate a destination role. The second network device can be a last network device in the data flow path that routes data to the second network device. The role tag for one or more flow rules for one or more network devices of the network devices can indicate an intermediate role. The one or more network devices of the network devices can be located between the first network device and the last network device in the data flow path.

The network controller system can comprises a network controller for a software-defined network (SDN) comprising the network devices. The program instructions can be further executable by the processor to store the one or more flow rules for the network devices in a memory of the network controller for the SDN. The network controller may comprise a server. At least one of the network devices can comprise at least one of a network switch or a network router. The blocking flow rule can comprises a flow rule comprising an action to block or drop data received from the first network device.

Determining the malicious activity on the data flow path can comprise receiving an indication of routing of malicious data on the data flow path. The indication of routing of malicious data on the data flow path can be received from a network security system. The network security system can comprises at least one of a firewall system, an anti-virus system, an anti-spyware system, or an intrusion prevention system (IPS).

The data flow path can be associated with a flow identifier (ID), and determining the routing of malicious data on the data flow path can comprise receiving an indication of malicious activity associated with the flow ID. The flow ID can comprise an identity of the first network device. The flow ID can comprise at least one of a media access control (MAC) address of the first network device, or an internet protocol (IP) address of the first network device. The flow ID can comprise an identity of the second network device. The flow ID can comprise: at least one of a media access control (MAC) address of the first network device or an internet protocol (IP) address of the first network device; and at least one of a MAC address of the second network device or an IP address of the second network device. The program instructions can be further executable by the processor to: in response to receiving a request to view network devices in the data flow path, presenting a listing of the network devices in the data flow path comprising roles tags indicative of the respective roles of the network devices.

Provided in some embodiments is a method for routing data. The method can comprise: determining a data flow path for routing data from a first network device to a second network device, wherein the data flow path comprises a plurality of network devices; determining, for at least the first network device of the network devices, one or more flow rules that, an output of the network device for outputting data, and a role tag indicative of a role of the network device in the data flow path, wherein the role tag for one or more flow rules for a first network device of the network devices indicates a source role; distributing, to at least the first network device of the network devices of the data flow path, the one or more flow rules determined for the network device; determining malicious activity on the data flow path; determining that the first network device is a source for the data flow path based at least in part on the role tag for the first network device; and sending, to the first network device and in response to determining the first network device is a source for the data flow path, a blocking flow rule to inhibit the first network device from routing malicious data.

In some instances, the method can further include: sending, to one or more of the network devices, a request for the one or more flow rules for the data flow path that are stored on the network device; receiving, from the one or more of the network devices, one or more flow rules for the data flow path; and generating a flow rules table for the data flow path using the received one or more flow rules for the data flow path.

The first network device can be a network device that receives data from the first network device in the data flow path. The role tag for one or more flow rules for a second network device of the network devices may indicate a destination role. The second network device can be a last network device in the data flow path that routes data to the second network device. The role tag for one or more flow rules for one or more network devices of the network devices can indicate an intermediate role. The one or more network devices of the network devices can be located between the first network device and the last network device in the data flow path.

The network controller system can comprises a network controller for a software-defined network (SDN) comprising the network devices. The program instructions can be further executable by the processor to store the one or more flow rules for the network devices in a memory of the network controller for the SDN. The network controller may comprise a server. At least one of the network devices can comprise at least one of a network switch or a network router. The blocking flow rule can comprises a flow rule comprising an action to block or drop data received from the first network device.

Determining the malicious activity on the data flow path can comprise receiving an indication of routing of malicious data on the data flow path. The indication of routing of malicious data on the data flow path can be received from a network security system. The network security system can comprises at least one of a firewall system, an anti-virus system, an anti-spyware system, or an intrusion prevention system (IPS).

The data flow path can be associated with a flow identifier (ID), and determining the routing of malicious data on the data flow path can comprise receiving an indication of malicious activity associated with the flow ID. The flow ID can comprise an identity of the first network device. The flow ID can comprise at least one of a media access control (MAC) address of the first network device, or an internet protocol (IP) address of the first network device. The flow ID can comprise an identity of the second network device. The flow ID can comprise: at least one of a media access control (MAC) address of the first network device or an internet protocol (IP) address of the first network device; and at least one of a MAC address of the second network device or an IP address of the second network device. The method can further include: in response to receiving a request to view network devices in the data flow path, presenting a listing of the network devices in the data flow path comprising roles tags indicative of the respective roles of the network devices.

As used throughout this application, the word "may" is used in a permissive sense (i.e., meaning having the potential to), rather than the mandatory sense (i.e., meaning must). The words "include," "including," and "includes" mean including, but not limited to. As used throughout this application, the singular forms "a," "an," and "the" include plural referents unless the content clearly indicates otherwise. Thus, for example, reference to "an element" may include a combination of two or more elements. As used throughout this application, the phrase "based on" does not limit the associated operation to being solely based on a particular item. Thus, for example, processing "based on" data A may include processing based at least in part on data A and based at least in part on data B unless the content clearly indicates otherwise. As used throughout this application, the term "from" does not limit the associated operation to being directly from. Thus, for example, receiving an item "from" an entity may include receiving an item directly from the entity or indirectly from the entity (e.g., via an intermediary entity). Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic or magnetic quantities within memories, registers, or other information storage devices, transmission devices, or display devices of the special purpose computer or similar special purpose electronic processing/computing device.

What is claimed is:

1. A network controller comprising:
    memory including computer readable instructions; and
    processor circuitry to execute the computer readable instructions to at least:
        assign role tags to a plurality of network devices in a data flow path corresponding to a data flow path identifier, the role tags to specify respective roles of respective ones of the plurality of network devices, the role tags including at least a source role tag to specify a source role and a destination role tag to specify a destination role, the source role tag to be assigned to a first group of one or more of the network devices via which data enters the data flow path, and the destination role tag to be assigned to a second group of one or more of the network devices via which data exits the data flow path;
        when activity classified as malicious is detected on the data flow path, identify, based on the data flow path identifier and the role tags, the first group of the network devices assigned the source role; and
        cause a blocking flow rule to be transmitted to the first group of the network devices, the first group of the network devices to respond to the blocking flow rule by blocking data from entry to the data flow path.

2. The network controller of claim 1, wherein the processor circuitry is to:
    identify the plurality of network devices to be included in the data flow path; and
    associate the plurality of network devices with the data flow path identifier.

3. The network controller of claim 1, wherein the processor circuitry is to:
    determine respective flow rules for respective ones of the plurality of network devices included in the data flow path; and
    cause the respective flow rules to be distributed to the respective ones of the plurality of network devices.

4. The network controller of claim 3, wherein the processor circuitry is to:
    identify an inoperable one of the plurality of network devices in the data flow path; and
    update the flow rules to cause data on the data flow path to be routed through a replacement network device instead of the inoperable one of the plurality of network devices.

5. The network controller of claim 1, wherein the processor circuitry is to generate the blocking flow rule when the malicious activity is detected.

6. The network controller of claim 1, wherein the processor circuitry is to form a flow rules table for the data flow path based on a plurality of flow rules, the flow rules at least one of generated by the network controller, or obtained from one or more of the plurality of network devices in response to a request.

7. The network controller of claim 6, wherein the network controller is a first network controller, and the plurality of flow rules are obtained from the one or more of the plurality of network devices when the first network controller is a replacement of a second network controller that is inoperable, the second network controller having generated the plurality of flow rules before becoming inoperable.

8. The network controller of claim 1, wherein the processor circuitry is to detect the malicious activity in response to a message from a firewall in the data flow path, the message including the data flow path identifier.

9. The network controller of claim 1, wherein the processor circuitry is to detect the activity classified as malicious in response to receipt of an indication of malicious activity associated with the data flow path identifier.

10. The network controller of claim 9, wherein the processor circuitry is to search a flow rules table associated with the data flow path identifier to identify the first group of the network devices assigned the source role tag.

11. The network controller of claim 10, wherein the flow rules table associated with the data flow path identifier includes an address of at least one of the first group of the network devices assigned the source role tag.

12. The network controller of claim 10, wherein the flow rules table associated with the data flow path identifier includes an address of at least one of the second group of the network devices assigned the destination role tag.

13. The network controller of claim 1, wherein the data flow path extends from the first group of the network devices to the second group of the network devices.

14. One or more machine readable storage devices comprising instructions which, when executed, cause one or more processors to at least:
  assign role tags to network devices included in a data flow path corresponding to a data flow path identifier, the role tags to specify respective roles of corresponding ones of the network devices, the role tags to include a source role tag and a destination role tag, the source role tag assigned to a first network device at which data enters the data flow path, and the destination role tag assigned to a second network device at which data exits the data flow path; and
  in response to a notification that malicious activity is detected on the data flow path, cause a blocking flow rule to be transmitted to the first network device, the blocking flow rule to cause the first network device to block data from entering the data flow path.

15. The one or more machine readable storage devices of claim 14, wherein the instructions cause the one or more processors to:
  identify the network devices to be included in the data flow path;
  generate the data flow path identifier; and
  associate the data flow path identifier with the data flow path.

16. The one or more machine readable storage devices of claim 14, wherein the instructions cause the one or more processors to:
  generate respective flow rules for corresponding ones of the network devices included in the data flow path, the flow rules to correspond to the role tags assigned to the corresponding ones of the network devices included in the data flow path; and
  generate a flow rules table for the data flow path based on the flow rules.

17. The one or more machine readable storage devices of claim 14, wherein the instructions cause the one or more processors to:
  request flow rules from the network devices included in the data flow path; and
  generate a flow rules table for the data flow path based on the flow rules received in response to the request, respective ones of the flow rules corresponding to respective ones of the network devices included in the data flow path, and the flow rules corresponding to respective role tags assigned to the corresponding ones of the network devices included in the data flow path.

18. The one or more machine readable storage devices of claim 14, wherein the notification of malicious activity is received from a firewall in the data flow path.

19. The one or more machine readable storage devices of claim 16, wherein the flow rules table includes a first address associated with the first network device and a second address associated with the second network device.

20. The one or more machine readable storage devices of claim 14, wherein the instructions cause the one or more processors to search a flow rules table to identify the first network device assigned the source role tag in response to the notification of the malicious activity, the flow rules table identifying the network devices included in the data flow path and the respective role tags of the respective ones of the network devices.

* * * * *